Figure 1:
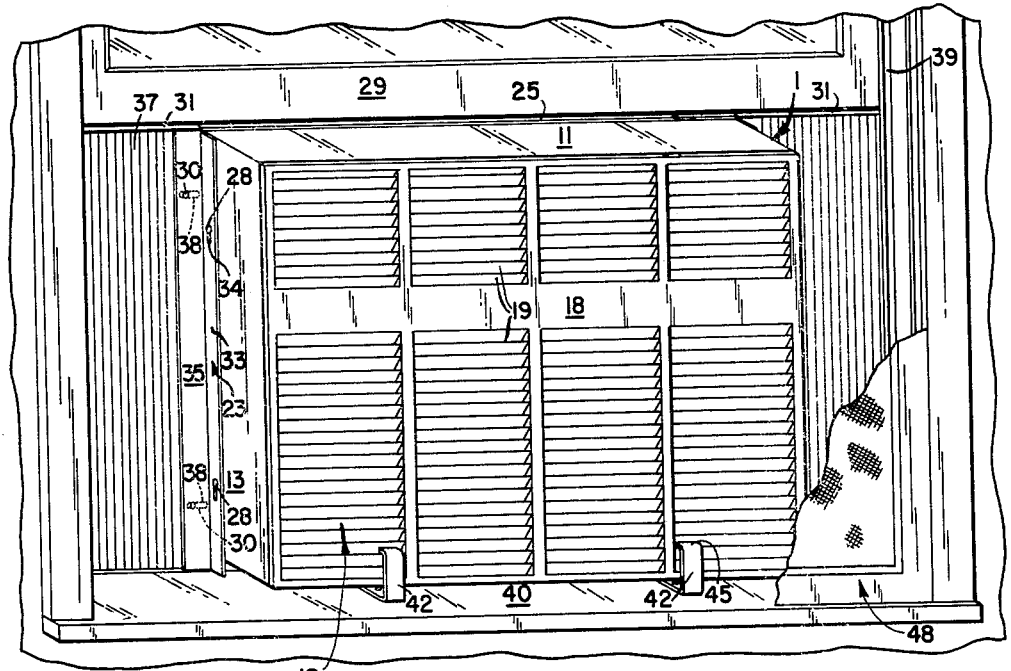

Oct. 26, 1965     D. E. MacLEOD     3,213,636

SIMPLIFIED MOUNTING FOR AIR CONDITIONING UNITS

Filed Jan. 25, 1965

INVENTOR.
DAVID E. MAC LEOD.
BY
*Frederick E. McMullen*
ATTORNEY.

3,213,636
SIMPLIFIED MOUNTING FOR AIR
CONDITIONING UNITS
David E. MacLeod, Syracuse, N.Y., assignor to Carrier Corporation, Syracuse, N.Y., a corporation of Delaware
Filed Jan. 25, 1965, Ser. No. 427,648
4 Claims. (Cl. 62—262)

This invention relates to a mounting apparatus for air conditioning units, and more particularly to a mounting apparatus for supporting air conditioning units within the window of a building.

The trend of modern design of air conditioning units of the room type appears to be toward small lightweight units. Design and engineering have reduced the depth or thickness of lightweight units to a point where the depth of some units is only slightly greater than the width of the window encasement. In all events, the depth of the lightweight units is substantially less than that of older units and of the present large capacity room type air conditioning units. This reduction in unit size and weight, and price, demands a simple yet safe and economical arrangement for installing lightweight units in the window opening; an arrangement which utilizes to the most practical advantage the small width, and small overall size of these units. Known mounting mechanisms generally designed for the older, larger, and heavier room units are overly complicated and unnecessarily expensive.

It is a principal object of the present invention to provide a new and improved mechanism for mounting air conditioning units of the room type within a window opening.

It is a further object of the present invention to provide an extremely simple and economical apparatus for securely holding an air conditioning unit in the window opening of a building.

It is a further object of the present invention to provide an improved window support apparatus particularly adapted for supporting relatively thin room air conditioning units which does not require removal of the storm window either during or after installation.

It is an object of the present invention to provide a window support apparatus for an air conditioning unit which prevents the unit from falling through the window upon raising of the window sash.

This invention relates to an apparatus for supporting an air conditioning unit having a pair of substantially vertical side walls and a relatively rigid outdoor grille member in the window opening of a building athwart the window stool without requiring removal of the storm window, the combination comprising a top bracket secured to the top wall of the unit, the top bracket having a flange extending outwardly for engagement with the window sash; at least one side bracket having a dimension slightly greater than the height of the unit secured to one of the unit side walls, the side bracket having a flange extending outwardly therefrom; a filler panel secured to the side bracket flange and arranged so as to substantially fill the space between the unit one side wall and the window opening; and at least one clamp member having a first part secured to the window ledge between the storm window and the window stool and the second part engaging the unit grille, the clamp member cooperating with the grille to limit outward movement of the unit relative to the window opening and to prevent tilting movement of the unit about the window stool.

Figure 2:
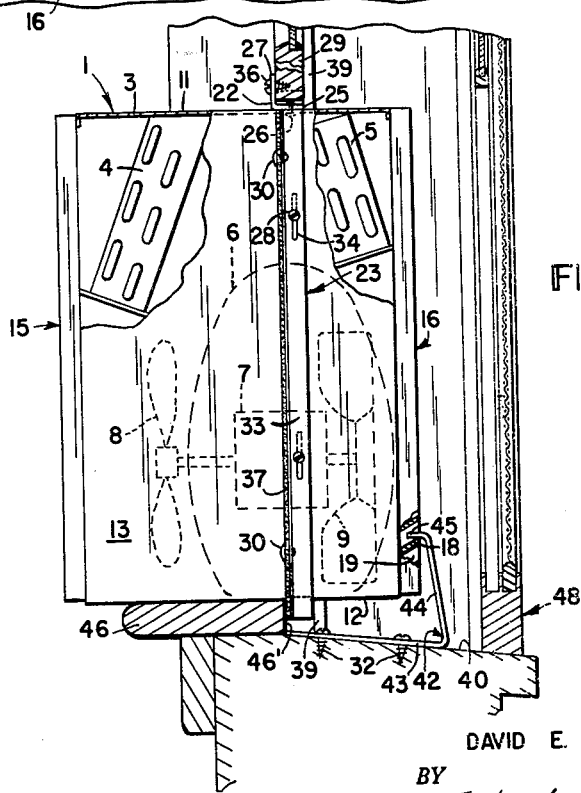

Other objects will be apparent from the ensuing description and drawings in which:

FIGURE 1 is a perspective view illustrating the exterior of a room air conditioning unit positioned in a window opening by the improved mounting mechanism of the present invention; and FIGURE 2 is a view partly in elevation and partly in section of an air conditioning unit supported in a window opening by the mounting mechanism shown in FIGURE 1.

Referring to the drawings, there is depicted a window type air conditioning unit designated generally by the numeral 1. Unit 1 comprises a housing 3 encasing indoor heat exchange coil 4, outdoor heat exchange coil 5, and compressor 6 suitably interconnected to form a closed refrigeration system. Motor 7, having indoor and outdoor fans 8, 9 operably connected thereto, is provided. As may be seen from the drawings, the thickness or width of air conditioning unit 1 is only slightly greater than the width of the window sill.

Housing 3 is generally rectangular with top and bottom walls 11, 12 respectively, side walls 13, and indoor and outdoor ends 15, 16 respectively. Outdoor end 16 is provided with a suitable protective grille or screen 18 formed from a relatively rigid material such as plastic or metal. In the embodiment shown, grille 18 delineates a plurality of generally horizontal slots or openings 19. Other suitable grille structures may be readily contemplated.

During operation of unit 1, indoor fan 8 draws air to be conditioned through the lower part of the unit indoor end 15 into heat exchange relation with indoor coil 4. By means of suitable baffling (not shown), the conditioned air is discharged through the upper part of indoor end 15 into the area being conditioned. Outdoor air under the influence of fan 9 is brought into heat exchange relation with outdoor coil 5, the air being discharged into the ambient through grille 18.

Top mounting bracket 22, which is generally L-shaped when seen in cross section, has side 25 thereof fastened to top wall 11 of housing 3 by suitable means such as rivets 26. Side 27 of bracket 22 extends outwardly from wall 11 for engagement with the inside surface of window sash 29 as will be explained hereinafter.

Side mounting brackets 23, generally L-shaped in cross section with slotted openings 34 in sides 33 are secured to side walls 13 of housing 3 for limited vertical adjusting movement by suitable means such as screws 28. Sides 35 of brackets 23 extend outwardly from housing side walls 13.

Filler panels 37, formed from suitable material such as hardboard, are dimensioned to substantially fill the space between the side walls 13 of housing 3 and window sash tracks 39. Panels 37 are secured to sides 35 of brackets 23 by suitable means such as screws 30. Slotted openings 38 permit limited outward movement relative to brackets 23 as will be more apparent hereinafter.

Clamps 42, which are substantially L shape, have leg 43 fastened to ledge or sill 40 of the window by suitable means such as screws 32. Leg 43 is preferably dimensioned so that engagement of the terminal end thereof with edge 46' of window stool 46 correctly locates clamp 42, and unit 1, in the window opening. With leg 43 of clamp 42 fastened to window sill 40, leg 44 thereof extends outwardly in the direction of window sash 29. The terminal end of leg 44, which is formed inwardly at 45, protrudes into selected opening 19 of grille 18 upon positioning of unit 1 in the window opening. Clamps 42 cooperate with grille 18 to hold unit 1 against both movement outward of the window opening and tilting movement about the window stool.

To mount the unit 1 within a window opening employing applicant's improved mounting mechanism, side mounting brackets 23 are loosely secured in raised position, shown by dotted lines in FIGURE 2 of the drawings, to side walls 13 of houisng 3 as by screws 28. Clamp 42 are fastened to window ledge 40 as by screws 32, the abutment of the terminal end of leg 43 thereof with edge 46' of the window stool being utilized to locate clamps 42 in the desired position. It is noted that clamps 42 are between window stool 46 and storm window 48.

Filler panels 37 are loosely attached to sides 35 of brackets 23 as by screws 30 with the innermost edge thereof closely adjacent side wall 13 of housing 3. Unit 1 is then inserted through the window opening to bring grille 18 thereof into engagement with clamps 42 and ends 45 thereof within a selected pair of grille openings 19. The abutment of grille 18 of unit 1 with clamps 42 locates unit 1 in the window opening.

According to a preferred construction, the angle between sides 33, 35 of brackets 23 is slightly greater than 90°. With grille 18 of unit 1 abutting clamps 42, filler panels 37, fastened to sides 35 of brackets 23, are forced into alignment with window sash tracks 39 so that, on outward movement of filler panels 37 relative to brackets 23, the outside edge of filler panels 23 enters the sash track 39 opposite thereto. It is understood that slotted openings 38 in filler panels 37 accommodate outward movement of the filler panels relative to side brackets 23. Screws 30 are then tightened to fixedly secure panels 37 to sides 35 of brackets 23. The slight bias imposed on filler panels 37 by this construction establishes a more effective weather seal and prevents looseness and rattling of the panels.

Side brackets 23 and filler panels 37, fixedly secured thereto, are moved downwardly to bring the lower portions of brackets 23 and filler panels 37 behind edge 46' of window stool 46. Unit 1 is then trapped between clamps 42 and the window stool 46. This construction insures that the unit 1 remains in place should window sash 29 be subsequently raised.

Window sash 29 may be lowered to bring the base and adjacent inside surface thereof into engagement with top bracket 22. Screw 36 fastens side 27 of bracket 22 to the window sash 29. Suitable sealing strips 31 may be interposed between the top edges of brackets 23 and filler panels 37 respectively and the base of window sash 29 to complete the installation.

The alignment of side brackets 23 and filler panels 37 secured thereto with edge 46' of stool 46 and of upstanding leg 27 of top bracket 22 with the inside surface of window sash 29 assures that ends 45 of clamps 42 enter a selected pair of grille openings 19. It is understood that the unit 1 may be mounted within the window opening so that one side of housing 3, or the side bracket fixed thereto, abuts the window casing. In that instance, a single filler panel is employed between the opposite side of housing 3 and the window casing.

By mounting mechanism of the invention, there is provided an economical, simple and effective apparatus for mounting a room air conditioning unit in the window opening of a building without the necessity of removing the storm window. By the improved simplified mounting mechanism of the present invention, the installer is able to mount the room air conditioning unit in the window with only the most rudimentary tools and without fear that the unit, during or subsequent to installation, will fall through the window should the window sash be raised.

While a preferred embodiment of the invention has been described, it will be understood the invention is not limited thereto since it may be otherwise embodied within the scope of the following claims.

I claim:

1. In apparatus for supporting an air conditioning unit in a window of a building, the window including a ledge and a stool, said window ledge being adapted to contact a storm window upon installation thereof, the apparatus supporting said unit athwart the window stool without requiring removal of the storm window, the air conditioning unit having a pair of substantially vertical side walls and a relatively rigid outdoor grille member at one end thereof defining a plurality of openings for communicating the unit outdoor heat exhange coil with the outdoors, the combination of a top bracket secured to the top wall of said unit, said top bracket having a flange extending outwardly for engagement with the window sash; at least one side bracket having a dimension slightly greater than the height of said unit side walls, said side bracket secured to one of said unit side walls, said side bracket having a flange extending outwardly therefrom; a filler panel secured to said side bracket flange and arranged so as to substantially fill the space between said unit one side wall and said window opening; and at least one clamp member having a first part secured to said window ledge between the storm window and the window stool and the second part engaging said unit grille, said clamp member cooperating with said grille to limit outward movement of said unit relative to said window opening and to prevent tilting movement of said unit about said window stool.

2. Apparatus according to claim 1 in which said clamp member first part is dimensioned for abutment with the window stool to locate said unit at a preselected depth in the window opening.

3. Apparatus according to claim 2 including means permitting limited vertical movement of said side bracket relative to said unit whereby the lower portion of said side bracket and the filler panel secured thereto may be moved behind the window stool to lock said unit in said window opening.

4. Apparatus according to claim 1 in which the terminal end of said clamp member second part extends outwardly, said clamp member terminal end being adapted to protrude into a selected one of said grille openings.

No references cited.

WILLIAM J. WYE, *Primary Examiner.*